US012410850B2

(12) United States Patent
Magnusson et al.

(10) Patent No.: US 12,410,850 B2
(45) Date of Patent: Sep. 9, 2025

(54) ROLLER BEARING AND GEAR ASSEMBLY (71) Applicant: TAURUS TECHNOLOGIES HOLDINGS, INC., Barrington, IL (US)

(72) Inventors: Marta Magnusson, Grimsby (CA); Stefan Magnusson, Grimsby (CA)

( * ) Notice: Subject to any disclaimer, the term of this patent is extended or adjusted under 35 U.S.C. 154(b) by 90 days.

(21) Appl. No.: 18/532,813

(22) Filed: Dec. 7, 2023

(65) Prior Publication Data

US 2025/0189016 A1 Jun. 12, 2025

(51) Int. Cl.
*F16H 55/10* (2006.01)
*F16C 19/18* (2006.01)
*F16H 13/08* (2006.01)

(52) U.S. Cl.
CPC ............ *F16H 13/08* (2013.01); *F16C 19/18* (2013.01); *F16C 2361/00* (2013.01); *F16H 55/10* (2013.01)

(58) Field of Classification Search
CPC .......... F16H 1/34; F16H 1/2854; F16H 55/10; F16C 33/36; F16C 33/585
See application file for complete search history.

(56) References Cited

U.S. PATENT DOCUMENTS

| 604,662 | A | * | 5/1898 | Keiper | F16H 55/10 74/465 |
| 3,242,755 | A | * | 3/1966 | Kuehnle | F16H 1/30 74/424.5 |
| 11,639,746 | B2 | * | 5/2023 | Levine | H02K 7/116 475/149 |

FOREIGN PATENT DOCUMENTS

| CN | 108757725 A | * | 11/2018 | ............... B21D 3/02 |
| DE | 102009025499 A1 | * | 1/2011 | ............... F16H 1/24 |
| DE | 102017222811 A1 | * | 6/2019 | |
| DE | 102018131100 A1 | * | 6/2020 | |
| DE | 202019005385 U1 | * | 7/2020 | |
| FR | 682309 A | * | 5/1930 | |
| GB | 153847 A | * | 11/1920 | |
| GB | 318337 A | * | 9/1929 | |
| WO | WO-2021176304 A1 | * | 9/2021 | ............. B29D 15/00 |

* cited by examiner

*Primary Examiner* — Sherry L Estremsky

(57) ABSTRACT

A roller gear and bearing assembly having roller gear bearings with semi-spherical engagement members is disclosed. Semi-spherical engagement members are offset on two distinct surfaces on roller gears, with corresponding semi-spherical receiver elements on the race of the roller gear and bearing assembly. An optional improvement to the roller gear and bearing assembly is configuring the roller gears and assembling the roller gear assembly such that the roller gear and bearing assembly will be under a pre-load and the roller gears will not lose contact with the races. A second optional improvement to the roller gear and bearing assembly uses replaceable semi-spherical engagement members are replaceable spherical rollers which fit into semi-spherical receiver elements on the roller gears.

9 Claims, 9 Drawing Sheets

ROLLER BEARING AND GEAR ASSEMBLY

This invention relates to a roller gear and bearing assembly having roller gears with semi-spherical engagement members. The roller gear bearings have the semi-spherical engagement members offset on two distinct surfaces, with corresponding semi-spherical receiver elements on the race of the roller gear and bearing assembly. When engaged, the offset semi-spherical engagement members allow for the bearing to be driven like a gear assembly.

BACKGROUND OF THE INVENTION

The present invention relates to a roller gear and bearing assembly. Roller gear assemblies and roller bearing assemblies are well known to the art. However, they are two distinct elements in common usage, because roller gears wear very quickly and/or deform if they bear any substantial load, and roller bearings are designed to roll as smoothly as possible to minimize friction when under load which makes it impossible to transfer power with them. Imposing a significant bearing load on a roller gear assembly can also cause it to operate in a non-smooth and discontinuous manner with irregularity in the power output.

A roller gear and bearing assembly that can bear significant loads as well as provide a power output would be a useful invention.

A roller gear and bearing assembly that maximizes smoothness and continuity of power output under bearing load would be a useful invention.

The present invention addresses these concerns.

SUMMARY OF THE INVENTION

Among the many objectives of the present invention is the provision of a roller gear and bearing assembly which can drive a power output even under bearing load.

Another objective of the present invention is to provide a roller gear and bearing assembly which has roller elements that can engage the race of the roller gear and bearing assembly smoothly and continuously.

Other objectives and advantages of the present invention will become apparent to those of ordinary skill in the art upon review of the disclosure hereof.

BRIEF DESCRIPTION OF THE DRAWINGS

FIG. 7 depicts a partial-transparency perspective view of the roller gear and bearing assembly.

FIG. 8 depicts a front view of the inner race of the roller gear and bearing assembly with roller gear bearings engaged.

DESCRIPTION OF THE PREFERRED EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

Though useful for many applications, the invention will be described as a planetary roller gear and bearing assembly. As will be apparent to those of ordinary skill in the art, the actual input power and output power sources are not shown, but the roller gear bearing will drive any reasonable output power load when powered by any reasonable input power load.

Figure 1:
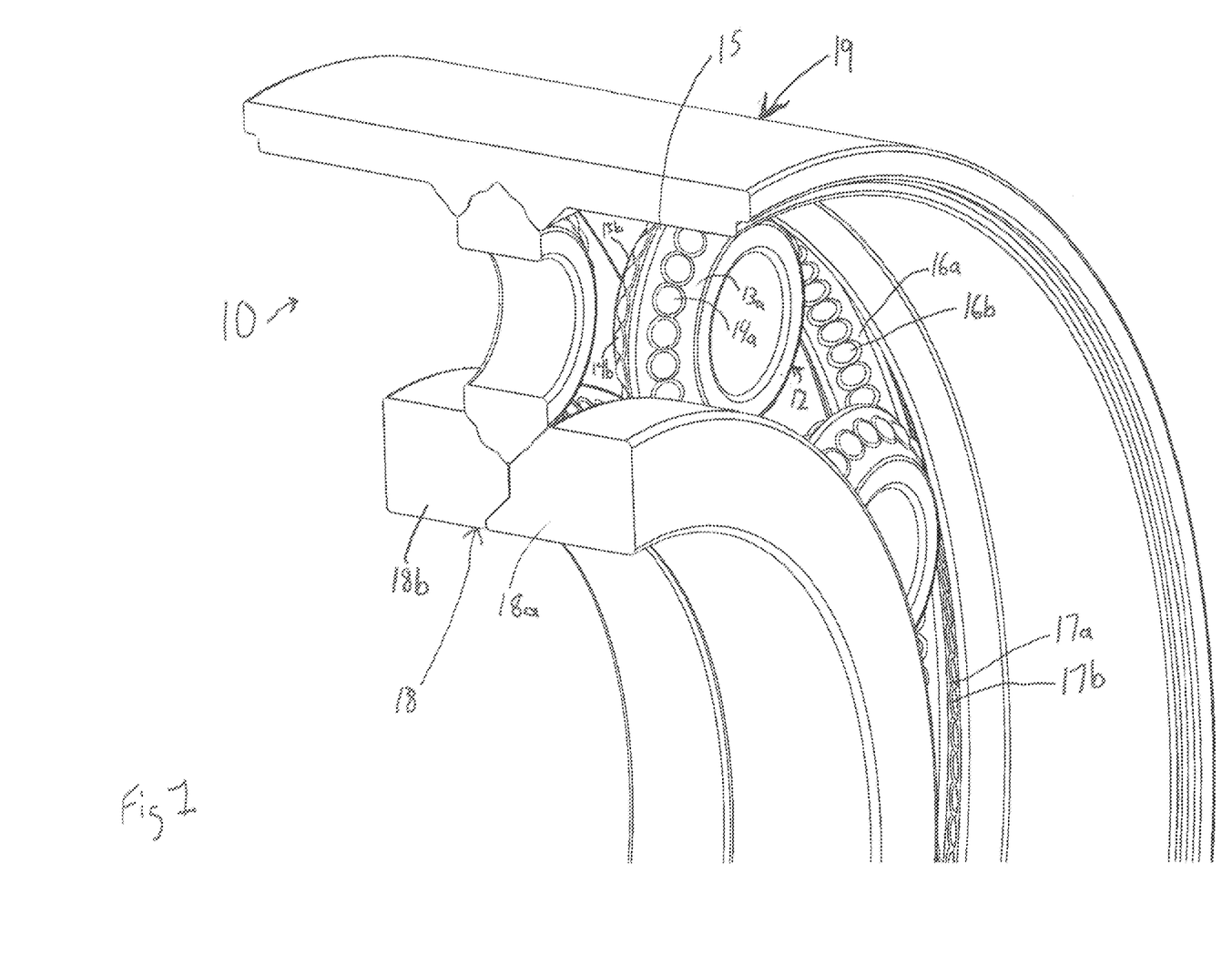
FIG. 1 depicts a perspective cutaway view of the first embodiment of the roller gear and bearing assembly.

By referring to FIG. 1, the roller gear and bearing assembly can be easily understood. Roller gear and bearing assembly 10 comprises outer race 19 and inner race 18, which surround a plurality of roller gears 12. Outer race 19 has a tapered outer raceway comprising first outer raceway face 16a and second outer raceway face 17a. Each of the outer raceway faces has a plurality of semi-spherical receiver elements (16b and 17b respectively). Roller gears 12 have an interrupted-taper outer surface comprising central bearing surface 15, first and second roller gear faces 13a and 13b, and a plurality of semi-spherical engagement members, e.g. corresponding semi-spherical engagement members 14a and 14b.

For purposes of this application, "semi-spherical" should be understood to mean a section of a sphere (a "semi-sphere section,") the semi-sphere section being defined by a plane which intersects the sphere. The semi-sphere section can comprise any section of a sphere up to and including a hemi-sphere (wherein the plane contains an axis of the sphere which is orthogonal to the axis of the sphere to which the plane is orthogonal) or less.

It is optional, but preferred, to assemble the roller gear and bearing assembly such that the roller gears have an uncompressed diameter slightly larger than the corresponding distance(s) between the corresponding opposing portions of the inner and outer races. This prevents irregularities and excess wear caused by the raceways being forced together and then springing apart under a variable load. If this is done, it is required that the roller gears be made of a material which can withstand such compression during the life of the roller gear bearing assembly as well as bearing load. This is referred to as a "pre-loaded" bearing or putting the bearing under "pre-load."

In the embodiment shown here, the semi-spherical engagement members are part of body of the roller gears, created when the roller gear is cast, stamped, or otherwise created. In an alternate embodiment (NOT SHOWN) the semi-spherical engagement members are created by inserting spherical rollers (i.e. round balls) into semi-spherical roller receiver elements in the body of the roller gear. These spherical rollers can be held in the proper position on the roller gear either solely by the assembly configuration making it impossible for them to disengage from the semi-spherical roller receiver elements and the corresponding semi-spherical receiver elements on the raceways, or by mechanical means such as a retaining ring or press-fitting, or by using through-holes as semi-spherical roller receiver elements and exerting some radial force against them with a spring or elastic material, or as otherwise is reasonable to persons of ordinary skill in the art.

Figure 2:
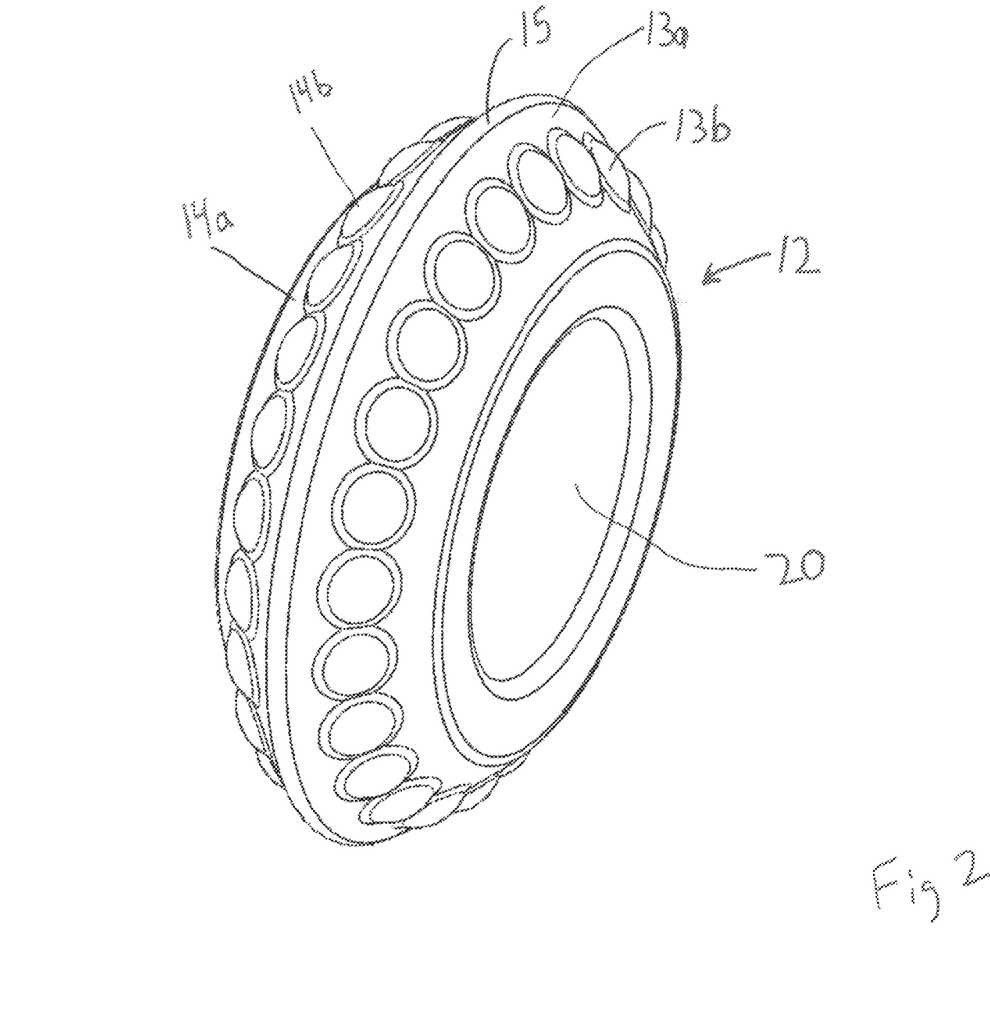
FIG. 2 depicts a perspective view of a roller gear and bearing roller gear.

FIG. 2 shows a roller gear 12. Roller gear 12 has bearing surface 15, which is constantly in contact with the inner and outer raceways and bears the majority of the bearing load (see description of FIG. 4). Roller gear 12 also has opposing faces 13a and 13b, which are in opposition to the corresponding portions of the raceways (see FIG. 1). It is strongly preferred that the opposing faces are tapered to the bearing surface 15, though the degree and shape of the taper will be application-specific.

Each opposing face of the roller gear has semi-spherical engagement members, e.g. 13b and 14b. It is strongly preferred, but not required, that the semi-spherical engagement members on the opposing faces be offset, such that the semi-spherical engagement member which is engaging one side of the raceway is not directly axially opposed to the semi-spherical engagement member which is engaging the other side of the raceway. The amount of offset will be application-specific. As shown, the offset is exactly half of the largest diameter of the semi-spherical engagement members, which in most cases will result in the most even distribution of power and/or bearing load.

It is preferred, but not required, that the roller gears not be completely solid but rather have a central cavity 20. It is optional to fill the central cavity 20 of the roller gear with an elastic dampening material or a reinforcing spring member. If captive spherical rollers are used, a circular spring member which can press against the interior surfaces of the spherical roller elements can also be used, enabling the spherical roller receiver elements to be through-holes and the spring easily removed for maintenance or adjustment of tension.

Figure 3:
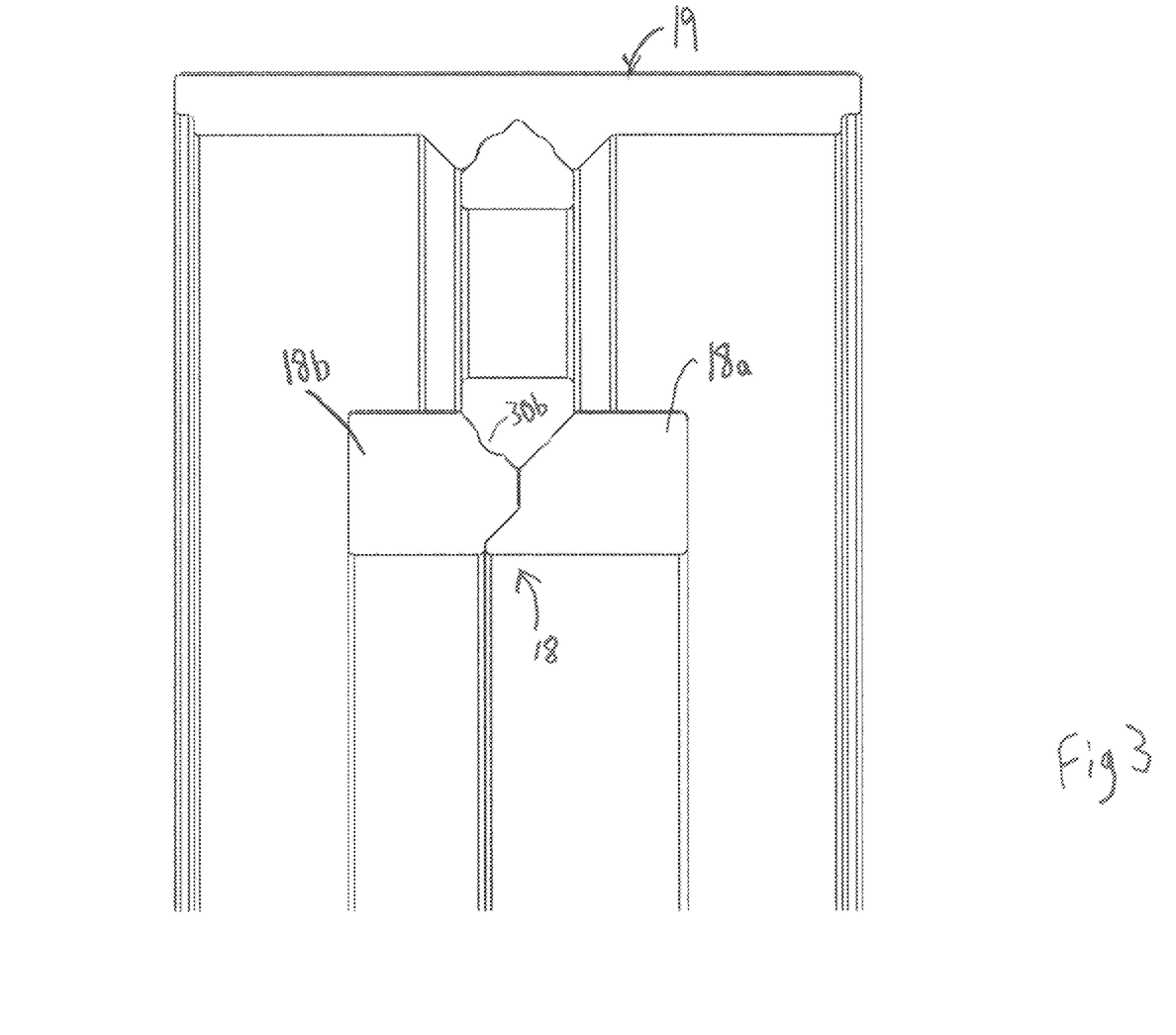
FIG. 3 depicts a cutaway view of the race of the roller gear and bearing assembly.

FIG. 3 shows the preferred configuration of inner race 18, with a semi-spherical receiver element 30b and the opposing outer race 19. While it is optional to make inner race 18 a single solid piece (or a single solid piece having replaceable raceway elements) it is strongly preferred to assemble it from two distinct pieces, i.e. first inner race member 18a and second inner race member 18b. These can be pressed together at the time of the assembly of the roller gear and bearing assembly, capturing the roller gears. It is optional, but preferred, to have the opposition of the inner race members allow for the imposition of a pre-load (as previously defined) on the roller gears. This is done by configuring the inner and outer races such that the distance between them is slightly smaller than the uncompressed outer diameter of the roller gear. The imposition of pre-load prevents uneven wear and tear on the roller gear assembly caused by uneven distribution of load when stopping or starting the application of input power and/or when the roller gear bearing assembly is subject to transient shocks and/or accelerations associated with a variable bearing load. Since the roller gear is always firmly in contact with both raceways, it cannot be separated from one or the other and then re-establish contact with a physical impact. The amount of pre-load will be application-specific.

Figure 4:
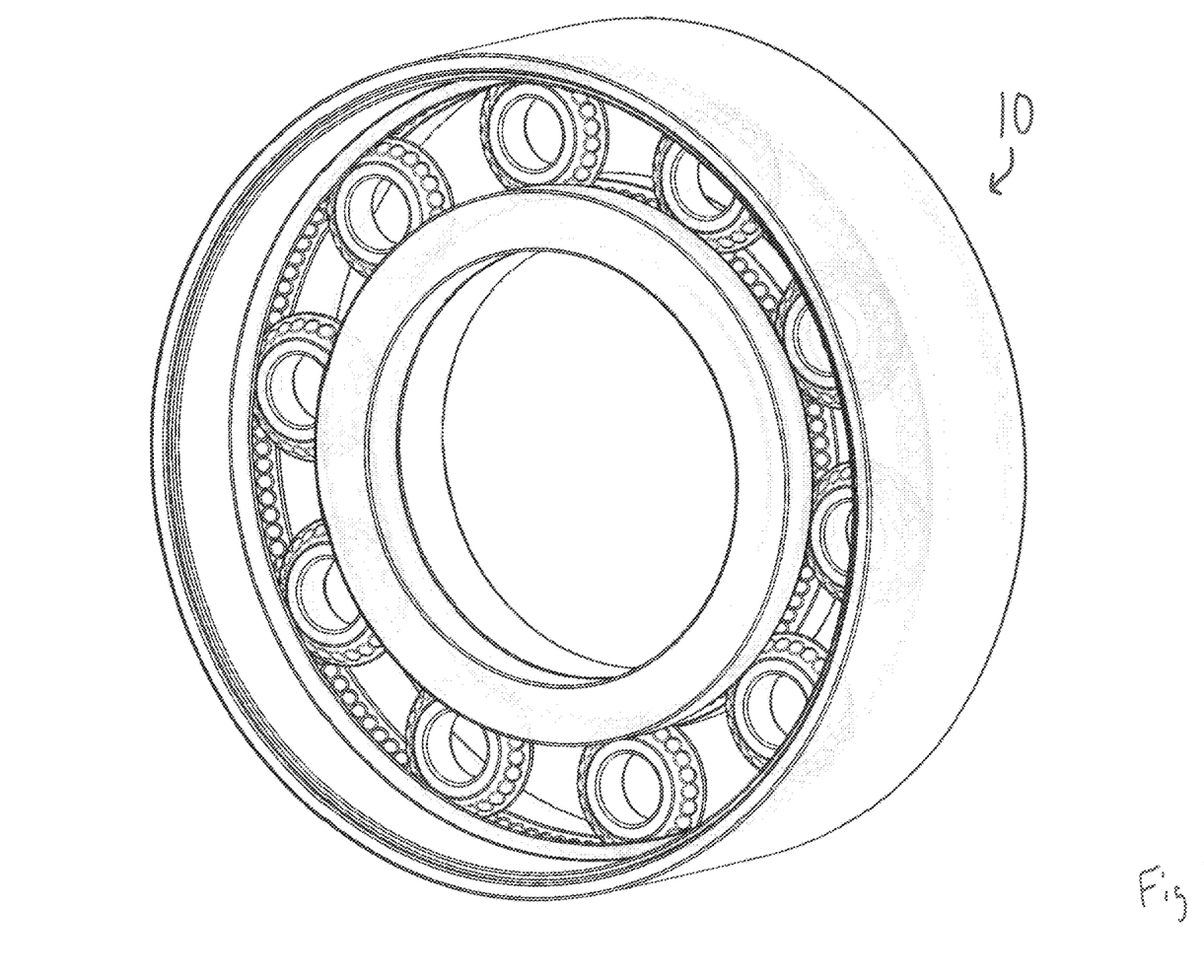
FIG. 4 depicts a perspective view of the complete roller gear and bearing assembly.

FIG. 4 shows the complete roller gear bearing assembly 10 ready for use. When input power from an input power device (NOT SHOWN) is provided to either outer race 19 or inner race 18, causing that race to rotate, the power will be transmitted to the other race by the roller gears, causing the other race to rotate in the opposite direction. The gear ratio, controlled by the diameter of the outer race to the inner race, will either increase or decrease the rotational speed of the provided input power depending on whether the outer race or the inner race of the roller gear bearing assembly is provided with input power. The other (unpowered) race can then provide output power to an output device (NOT SHOWN) as is known in the art. Input power can also be applied directly to the roller gears as in the "planetary" form of gear drive, which is well known in the art.

Unlike traditional roller gears, the roller gear bearing assembly can withstand significant amounts of bearing load (which is defined as load which would tend to compress the roller gears in the raceways, e.g. an axle affixed to the inner race which bears some of the weight of a vehicle) while suffering no loss of efficiency or inconsistent output of power due to distortion caused by bearing load, even a variable bearing load which includes transient shocks (e.g. a vehicle using an axle as in the previous example which is traversing an uneven roadway.) The smooth interaction of the semi-spherical engagement members with the semi-spherical receiver elements provides continuous and consistent power output even while under bearing load. The geometry of the engagement between the roller gears and the raceways also greatly reduces the negative effects of both radial and axial sway or transient accelerations since they can move against each other without breaking, chipping, or binding as in traditional roller gears.

Figure 5:
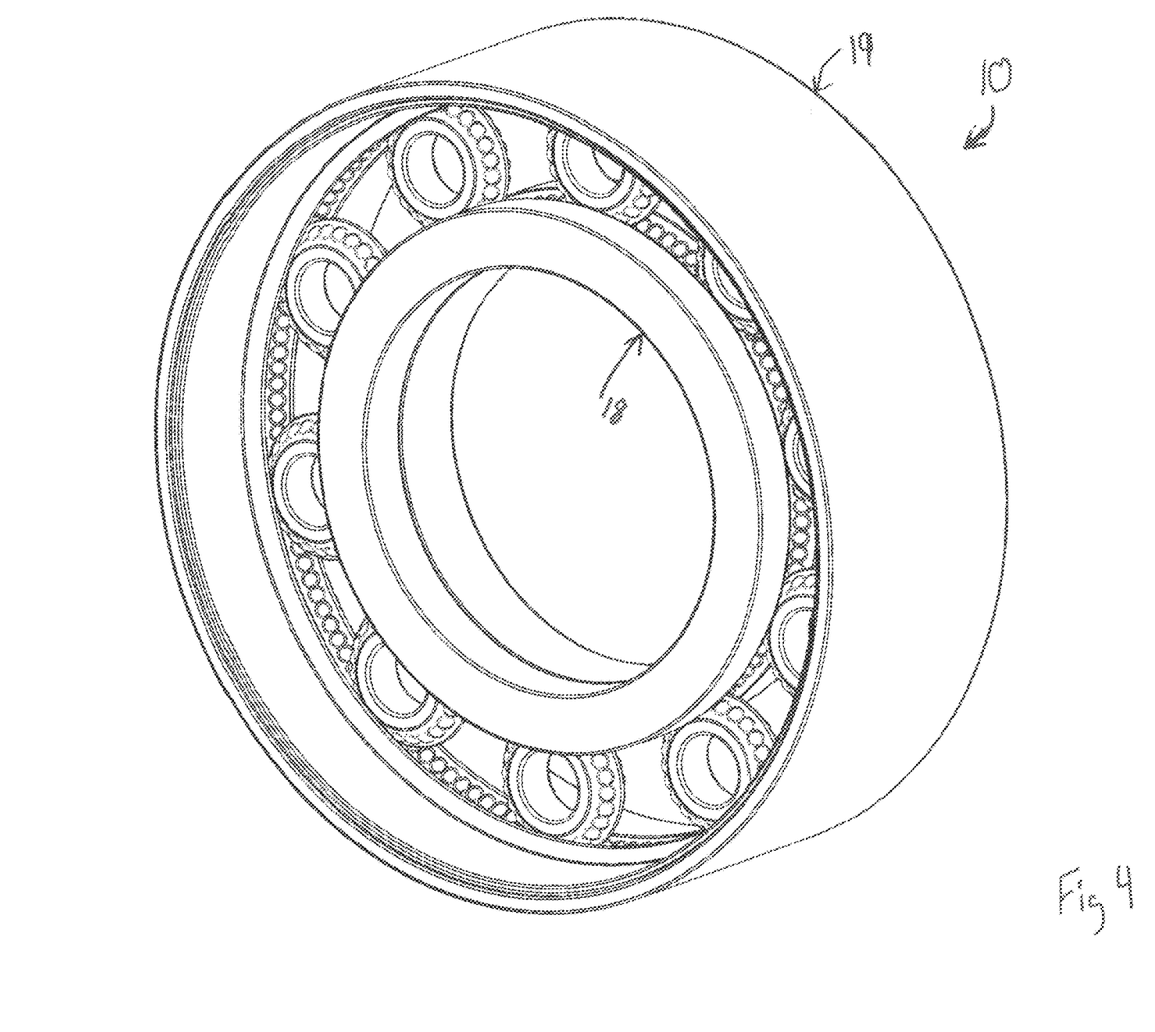
FIG. 5 depicts a perspective cutaway view of the complete roller gear and bearing assembly.

FIG. 5 shows the roller gear bearing assembly 10 ready for use as in FIG. 4, but with a cutaway view of the roller gears which are diametrically opposed and engaged with the raceways and a multi-part inner race.

Figure 6:
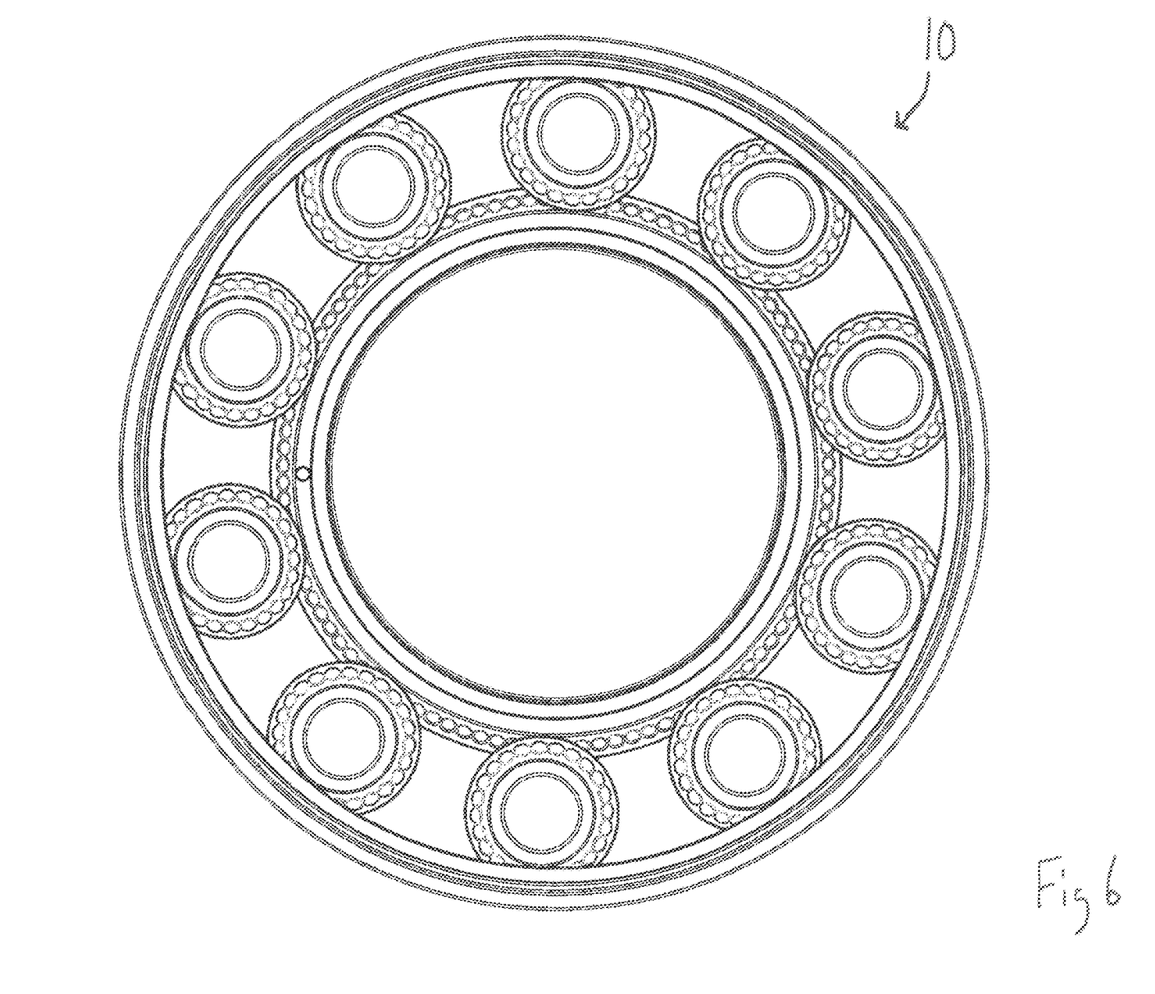
FIG. 6 depicts a side view of the complete roller gear and bearing assembly.

FIG. 6 shows an alternate view of the roller gear bearing assembly 10 ready for use as in FIG. 4.

FIG. 7 shows the roller gear bearing assembly 10 ready for use as in FIG. 4, but with portions of the inner and outer races semi-transparent for ease of understanding of the exact configuration of the roller gears and the inner and outer races.

FIG. 8 shows a view of the inner race, here comprising the preferred multi-part elements 18a and 18b, engaged with the roller gears 12 for ease of understanding of the exact configuration of the roller gears and the inner race. The offsets of the semi-spherical engagement members and the semi-spherical receiver elements are readily apparent in this view.

Figure 9:
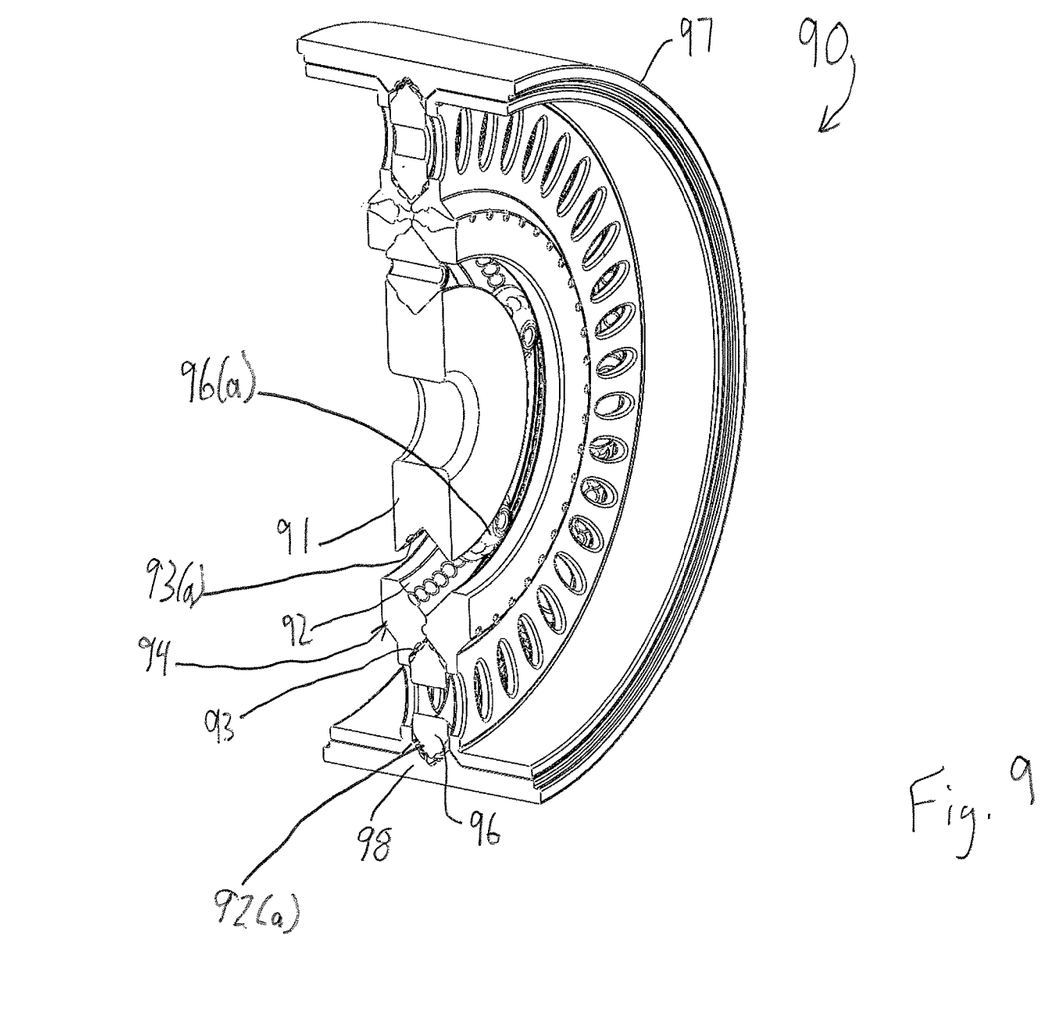
FIG. 9 depicts a cutaway perspective view of a first alternate embodiment of the invention.
Figure 13:
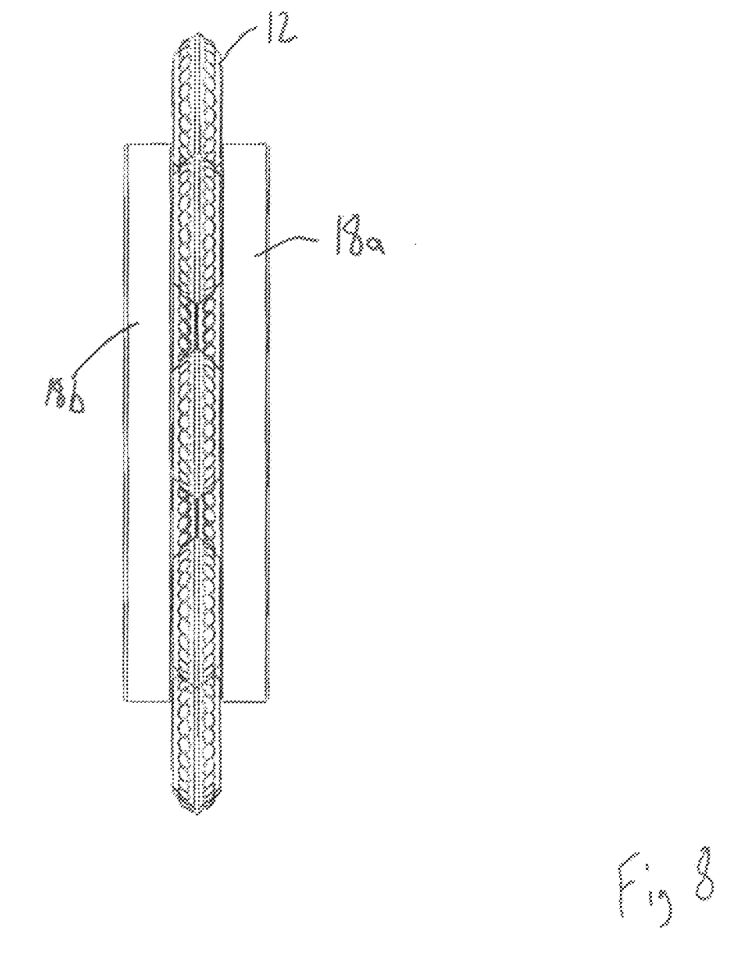

FIG. 9 shows a first alternate embodiment of the invention. Roller gear bearing assembly 90 is surrounded by case 97 and includes first outer race 98 which together with first inner race 94 allows outer roller gears 96 to move on first outer raceway 92(a) and first inner raceway 93 and thus act as roller gears as previously described. First inner race 94 also includes second outer raceway 92. Second inner race 91 has second inner raceway 93(a). Together second outer raceway 92 and second inner raceway 93(a) allow inner roller gears 96(a) to act as roller gears as previously described. Power can be provided to either set of roller gears through an input power device (NOT SHOWN) which will cause the other set of roller gears to rotate accordingly and provide output power to an output device (NOT SHOWN.) This embodiment allows the roller gear bearing assembly to serve as a gear-up or gear-down component in a complete drive train and/or to have two separate power input devices or two separate output devices. Power can be provided to either set of roller gears through an input power device (NOT SHOWN) which will cause the other set of roller gears to rotate accordingly and provide output power to an output device (NOT SHOWN.) An additional optional improvement would be to provide a mechanical or electro-mechanical brake or other locking mechanism which allows one or the other of the sets of roller gears to be locked in place relative to the other set of roller gears. This would convert the roller gear bearing 90 into a single-set roller gear bearing assembly analogous to those previously described.

It will be apparent to those of ordinary skill in the art that the embodiments herein could be combined in varied combination or as a single unit, granting the improvements of each to a single roller gear and bearing assembly.

While various embodiments and aspects of the present invention have been described above, it should be understood that they have been presented by way of example only, and not limitation. Thus, the breadth and scope of the present invention should not be limited by any of the above exemplary embodiments.

This application-taken as a whole with the abstract, specification, and drawings being combined-provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

The invention claimed is:

1. A roller gear and bearing assembly comprising:
   a) A roller gear and bearing race, the roller gear and bearing race having an upper raceway and a lower raceway, the upper raceway and the lower raceway being tapered, the upper raceway and the lower raceway each having a first face and a second face, all of the first faces and the second faces having a plurality of semi-spherical receiver elements; and,
   b) A plurality of roller gears, each of the roller gears being tapered to correspond with the upper and lower raceways, each of the roller gears having a plurality of semi-spherical engagement members such that the roller gears can engage with the upper and lower raceways, allowing the roller gear and bearing assembly to rotate when driven by an input power source and deliver output power to an output device while bearing a bearing load.

2. The roller gear and bearing assembly of claim 1, wherein the semi-spherical receiver elements of each of the first faces are offset from the semi-spherical receiver elements of the second faces such that when one of the semi-spherical engagement members of one of the roller gears is fully engaged with one of the semi-spherical receiver elements of the first face, the semi-spherical engagement members of that roller gear is not fully engaged with the semi-spherical receiver element of the second face directly opposite the corresponding semi-spherical receiver element of the first face.

3. The roller gear and bearing assembly of claim 2, wherein the offset between the semi-spherical receiver elements of one of the first faces and the corresponding second face is exactly half of the diameter of the semi-spherical receiver elements.

4. The roller gear and bearing assembly of claim 3 wherein the semi-spherical engagement members on the first and second faces of the roller gears are offset by the same amount as the semi-spherical engagement members on the corresponding first and second faces of the upper and lower raceways.

5. The roller gear and bearing assemblies of claim 3 wherein the semi-spherical engagement members are spherical rollers which fit into semi-spherical roller gear receiver elements on the first and second faces of the roller gears.

6. The roller gear and bearing assembly of claim 2 wherein the semi-spherical engagement members on the first and second faces of the roller gears are offset by the same amount as the semi-spherical engagement members on the corresponding first and second faces of the upper and lower raceways.

7. The roller gear and bearing assemblies of claim 6 wherein the semi-spherical engagement members are spherical rollers which fit into semi-spherical roller gear receiver elements on the first and second faces of the roller gears.

8. The roller gear and bearing assemblies of claim 2 wherein the semi-spherical engagement members are spherical rollers which fit into semi-spherical roller gear receiver elements on the first and second faces of the roller gears.

9. The roller gear and bearing assemblies of claim 1 wherein the semi-spherical engagement members are spherical rollers which fit into semi-spherical roller gear receiver elements on the first and second faces of the roller gears.

* * * * *